United States Patent
Dudar et al.

(10) Patent No.: US 9,797,809 B2
(45) Date of Patent: Oct. 24, 2017

(54) SYSTEM AND METHODS FOR DIAGNOSING PREMATURE REFUELING SHUTOFF

(71) Applicant: Ford Global Technologies, LLC, Dearborn, MI (US)

(72) Inventors: Aed M. Dudar, Canton, MI (US); Russell Randall Pearce, Ann Arbor, MI (US); Scott A. Bohr, Novi, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 964 days.

(21) Appl. No.: 14/084,207

(22) Filed: Nov. 19, 2013

(65) Prior Publication Data
US 2015/0142293 A1 May 21, 2015

(51) Int. Cl.
*G06G 7/70* (2006.01)
*G01M 15/05* (2006.01)
*F02M 25/08* (2006.01)
*B60K 15/035* (2006.01)

(52) U.S. Cl.
CPC ........ *G01M 15/05* (2013.01); *F02M 25/0809* (2013.01); *F02M 25/0836* (2013.01); *B60K 15/035* (2013.01)

(58) Field of Classification Search
CPC .............. G01M 15/05; F02M 25/0836; F02M 25/0809; B60K 15/035
See application file for complete search history.

(56) References Cited

U.S. PATENT DOCUMENTS

| 4,926,914 A | 5/1990 | Morizumi et al. |
| 4,962,744 A | 10/1990 | Uranishi et al. |
| 5,172,655 A | 12/1992 | Forgacs |
| 5,878,728 A | 3/1999 | Kidokoro et al. |
| 6,167,923 B1 | 1/2001 | Hartsell, Jr. |
| 6,347,642 B1 | 2/2002 | Schulte |
| 6,360,789 B2 | 3/2002 | Walker et al. |
| 6,722,187 B2 | 4/2004 | Grieve et al. |

(Continued)

FOREIGN PATENT DOCUMENTS

WO 0140109 A1 6/2001

OTHER PUBLICATIONS

Anonymous, "Dispensing Gas Station Fuel Pump Flow Rate Synchronization With Vehicle to Minimize Shutoffs," IPCOM No. 000234534, Published Jan. 16, 2014, 2 pages.

(Continued)

*Primary Examiner* — Hung Q Nguyen
(74) *Attorney, Agent, or Firm* — James Dottavio; McCoy Russell LLP (57) ABSTRACT

A method for localizing restrictions in a fuel system during refueling, comprising: monitoring fuel tank pressure, fuel vapor canister temperature, and evaporative leak check module pressure during a refueling event; and responsive to a premature shutoff event, indicating a location of a restriction among a plurality of locations based on whether monitored pressure and temperature changes during the refueling event are greater than respective thresholds. In this way, the cause of a premature shutoff event may be diagnosed without requiring additional sensors within the fuel system.

8 Claims, 5 Drawing Sheets

(56) References Cited

U.S. PATENT DOCUMENTS

| | | |
|---|---|---|
| 6,822,565 B2 | 11/2004 | Thomas et al. |
| 6,880,585 B2 | 4/2005 | Hart et al. |
| 7,000,654 B1 | 2/2006 | Rossi |
| 7,484,500 B2 | 2/2009 | Terada |
| 7,990,275 B1 | 8/2011 | Milanovich et al. |
| 8,397,552 B2 | 3/2013 | Jackson et al. |
| 8,447,495 B2 | 5/2013 | Pearce et al. |
| 8,448,675 B2 | 5/2013 | Mellone et al. |
| 8,583,305 B2 | 11/2013 | Novak et al. |
| 2010/0224171 A1* | 9/2010 | Peters ................ F02M 25/0836 123/520 |
| 2011/0168140 A1* | 7/2011 | DeBastos ........... F02M 25/0818 123/521 |
| 2013/0096774 A1 | 4/2013 | Takata |
| 2014/0026992 A1 | 1/2014 | Pearce et al. |

OTHER PUBLICATIONS

Anonymous, "Slow Fuel Fill Arbitration for PHEV Vehicles," IPCOM No. 000239074, Published Oct. 9, 2014, 2 pages.

Anonymous, "A Plugged EVAP Canister Fresh Air Port Diagnostic Using CVS Current Feedback," IPCOM No. 000240458, Published Jan. 30, 2015, 2 pages.

Dudar, Aed M. et al., "Systems and Methods for an Externally Accessible Refueling Request Switch," U.S. Appl. No. 14/265,220, filed Apr. 29, 2014, 48 pages.

Dudar, A. et al., "Systems and Methods for Engine-Off Natural Vacuum Leak Testing," U.S. Appl. No. 14/687,792, filed Apr. 15, 2015, 52 pages.

Yang, D. et al., "Fuel Tank Depressurization Before Refueling a Plug-In Hybrid Vehicle," U.S. Appl. No. 14/692,487, filed Apr. 21, 2015, 39 pages.

\* cited by examiner

SYSTEM AND METHODS FOR DIAGNOSING PREMATURE REFUELING SHUTOFF

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

During a refueling event, fuel vapor located in the fuel tank may be diverted to the fuel vapor canister by opening as fuel tank isolation valve prior to the addition of fuel to the fuel tank. Fuel vapors generated during refueling may also be diverted to the fuel vapor canister in this way. Air that is stripped of fuel vapor may be diverted from the fuel vapor canister to atmosphere via a vent line, which may include a vent valve, air filter, etc.

However, restrictions, such as blockages or stuck valves may impede the movement of fuel vapor or air through the evaporative emissions system. In some scenarios, the restrictions may result in the premature termination of a refueling event. However, as there are numerous potential restriction points within the evaporative emissions system, the cause of premature refueling shutoff is often not apparent. Indeed, the most common solution is a complete dismantling of the evaporative emissions system, which may be time consuming and expensive.

The inventors herein have recognized the above described problems, and have developed systems and methods to at least partially address these issues. In one example, a method for localizing restrictions in a fuel system during refueling, comprising: monitoring fuel tank pressure, fuel vapor canister temperature, and evaporative leak check module pressure during a refueling event; and responsive to a premature shutoff event, indicating a location of a restriction among a plurality of locations based on whether monitored pressure and temperature changes during the refueling event are greater than respective thresholds. In this way, the cause of a premature shutoff event may be diagnosed without requiring additional sensors within the fuel system.

In another example, a fuel system for a vehicle, comprising: a fuel tank for storing fuel used by a vehicle engine; one or more fuel limit vent valves coupled to the fuel tank; a grade vent valve coupled to the fuel tank; a fuel tank pressure transducer coupled to the fuel tank; a canister coupled to the fuel tank for receiving and storing fuel vapors; a fuel tank isolation valve coupled between the fuel tank and the canister; a vent line coupled between the canister and atmosphere; and a control system including executable instructions stored in non-transitory memory for: during a refueling event, monitoring a fuel tank pressure; and responsive to a premature shutoff event, indicating a restriction in the grade vent valve and/or the one or more fuel limit vent valves when a fuel tank pressure change during the refueling event is less than a first fuel tank pressure threshold. In this way, the cause of a premature shutoff event may be diagnosed without requiring the dismantling and inspection of the entire fuel system, thereby saving time, money, and resources.

In yet another example, a method for a vehicle fuel system, comprising: receiving a request for a refueling event; venting fuel vapor from a fuel tank to a fuel vapor canister by opening a fuel tank isolation valve; allowing the vehicle fuel system to equilibrate; establishing baseline values for fuel tank pressure, fuel vapor canister temperature, and evaporative leak check module pressure; monitoring values for fuel tank pressure, fuel vapor canister temperature, and evaporative leak check module pressure during the refueling event; responsive to a premature shutoff event, indicating a location of a restriction among a plurality of locations based on whether monitored pressure and temperature changes during the refueling event are greater than respective thresholds. In this way, premature shutoff events may be diagnosed based on fuel system conditions during refueling, allowing for different potential restriction points to be discerned using sensors within the fuel system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
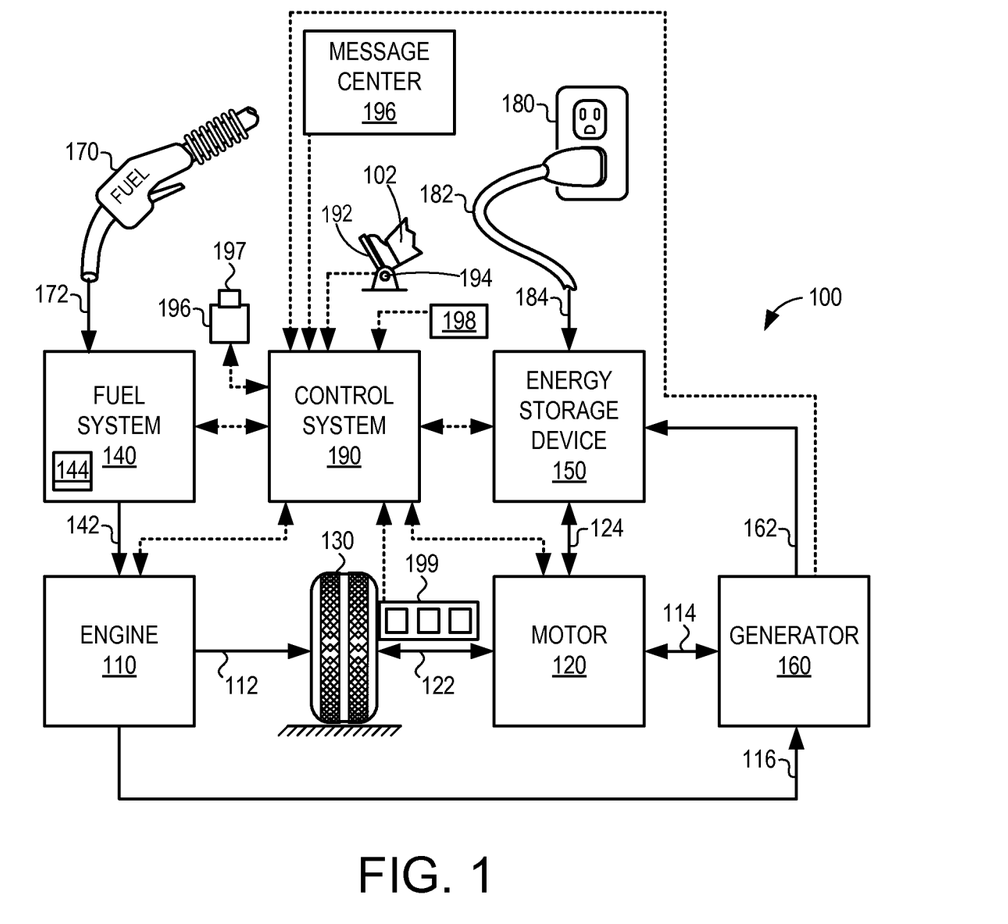
FIG. 1 schematically shows an example vehicle propulsion system.
Figure 2:
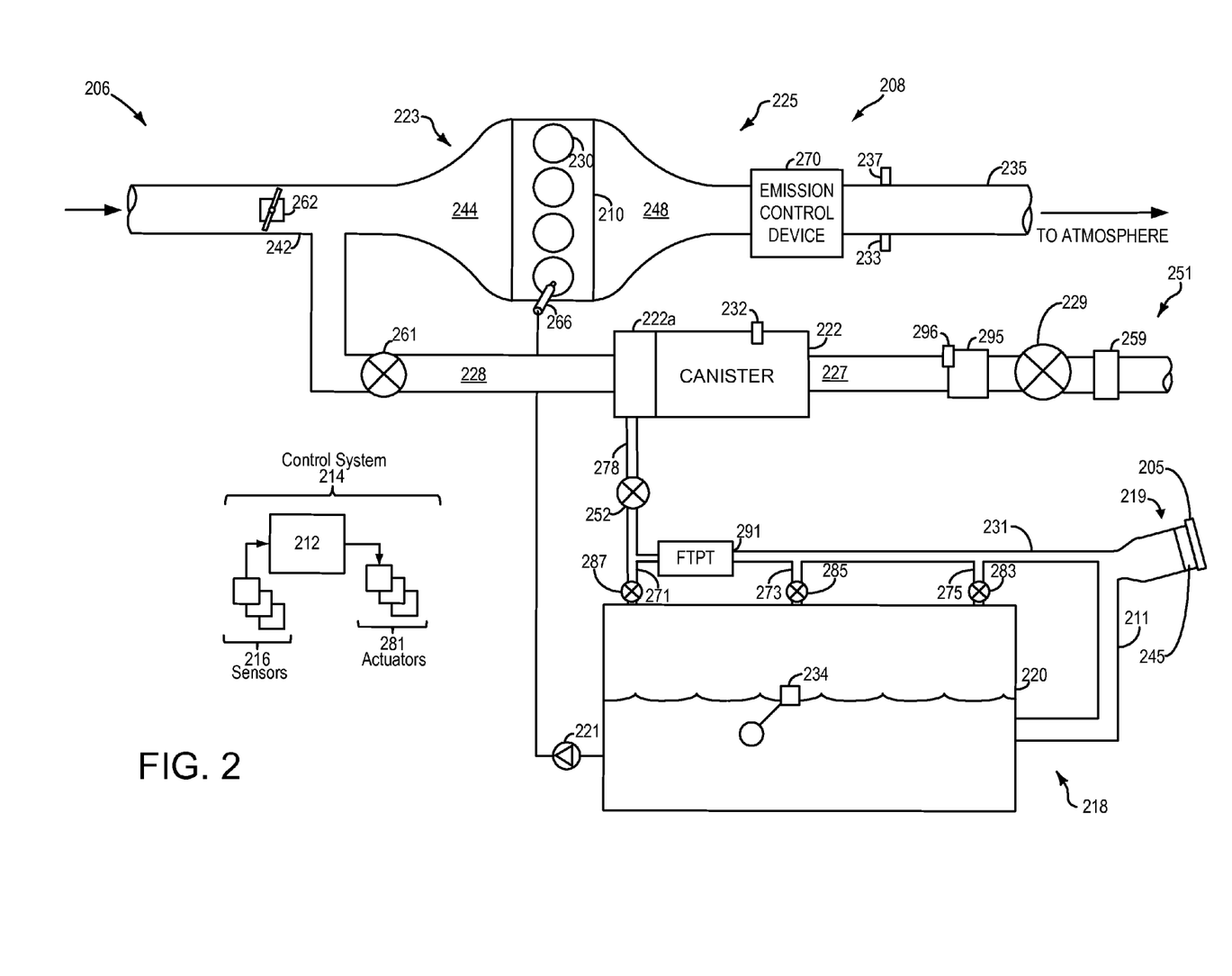
FIG. 2 schematically shows an example vehicle system with a fuel system and an evaporative emissions system.
Figure 3:
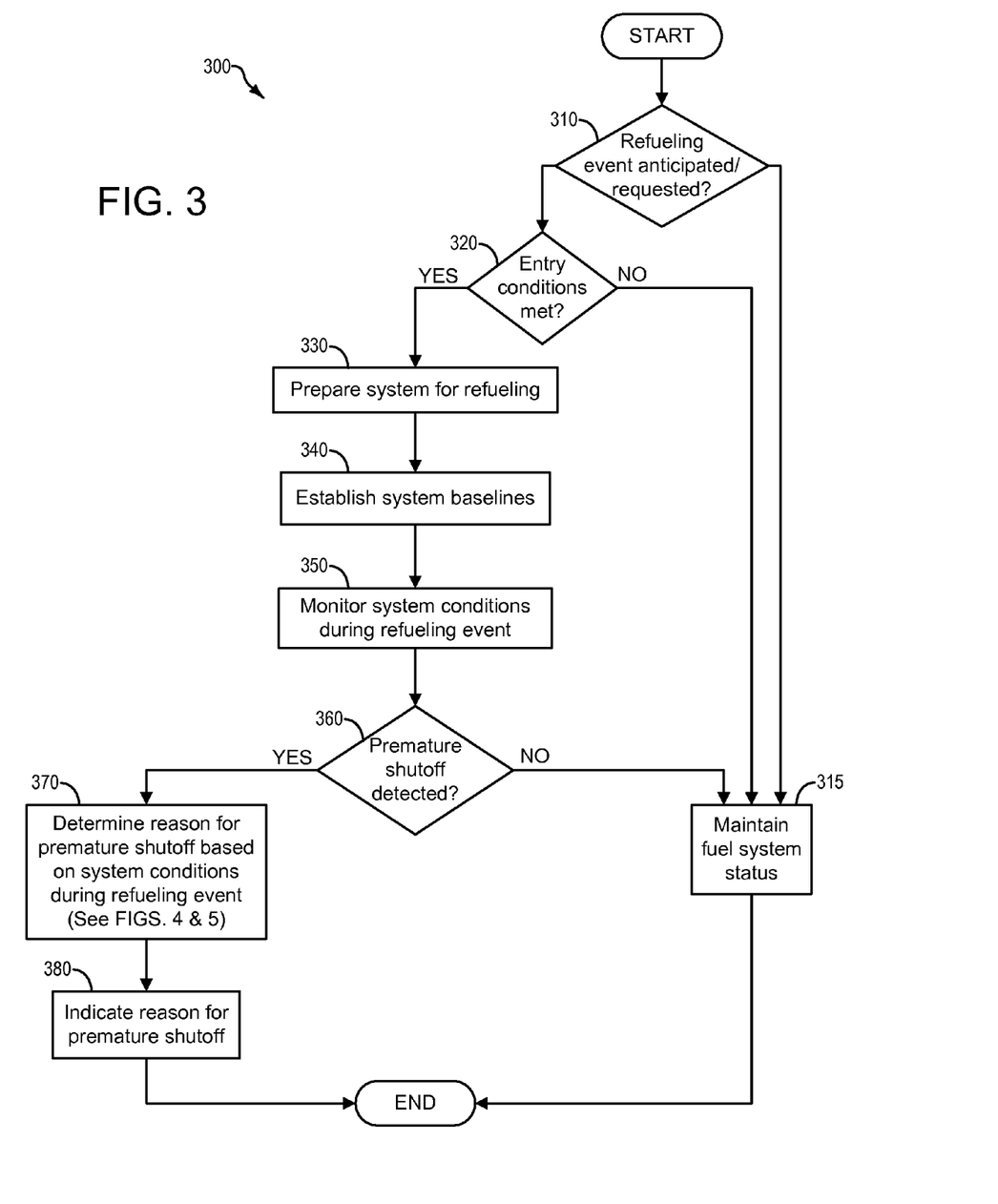
FIG. 3 shows an example method for diagnosing premature shutoff events during refueling events.
Figure 4:
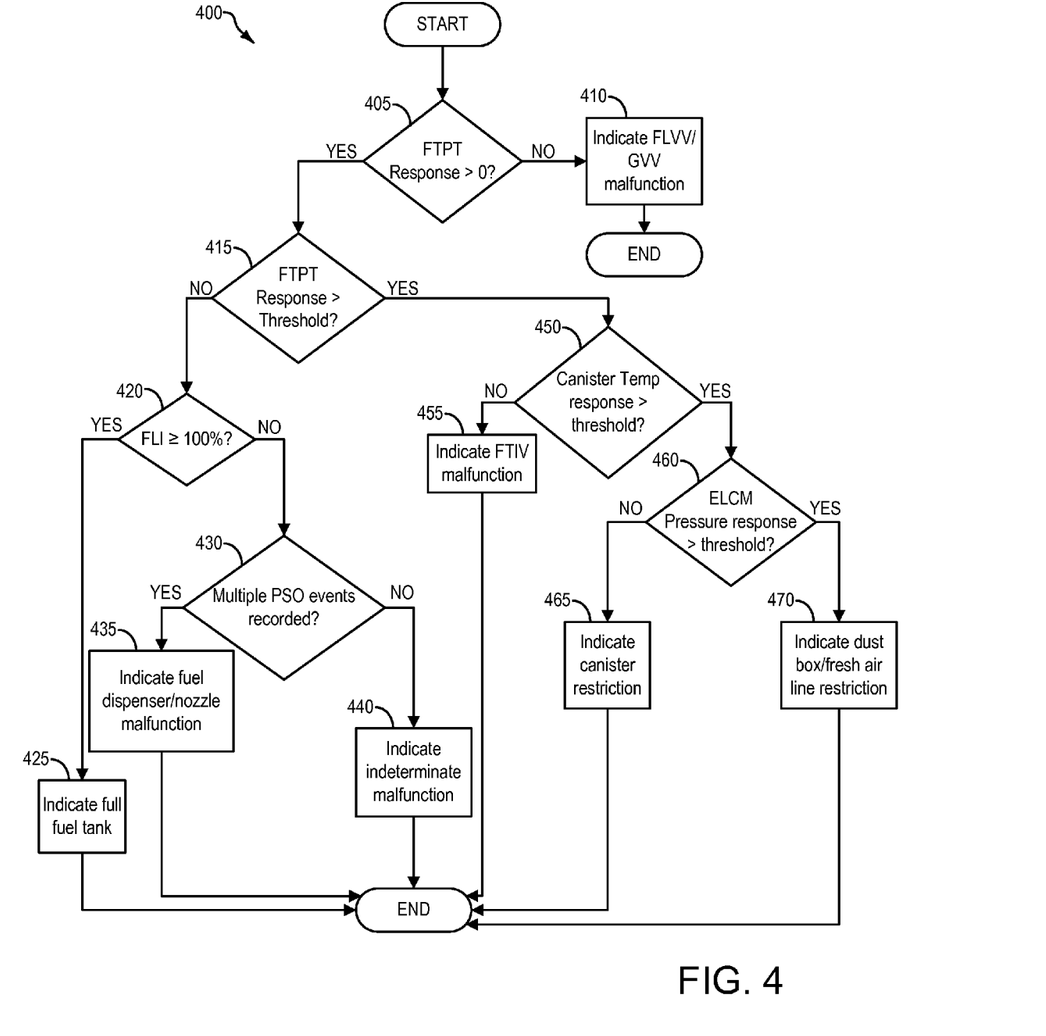
FIG. 4 shows an example method for determining the cause of a premature shutoff event.
Figure 5:
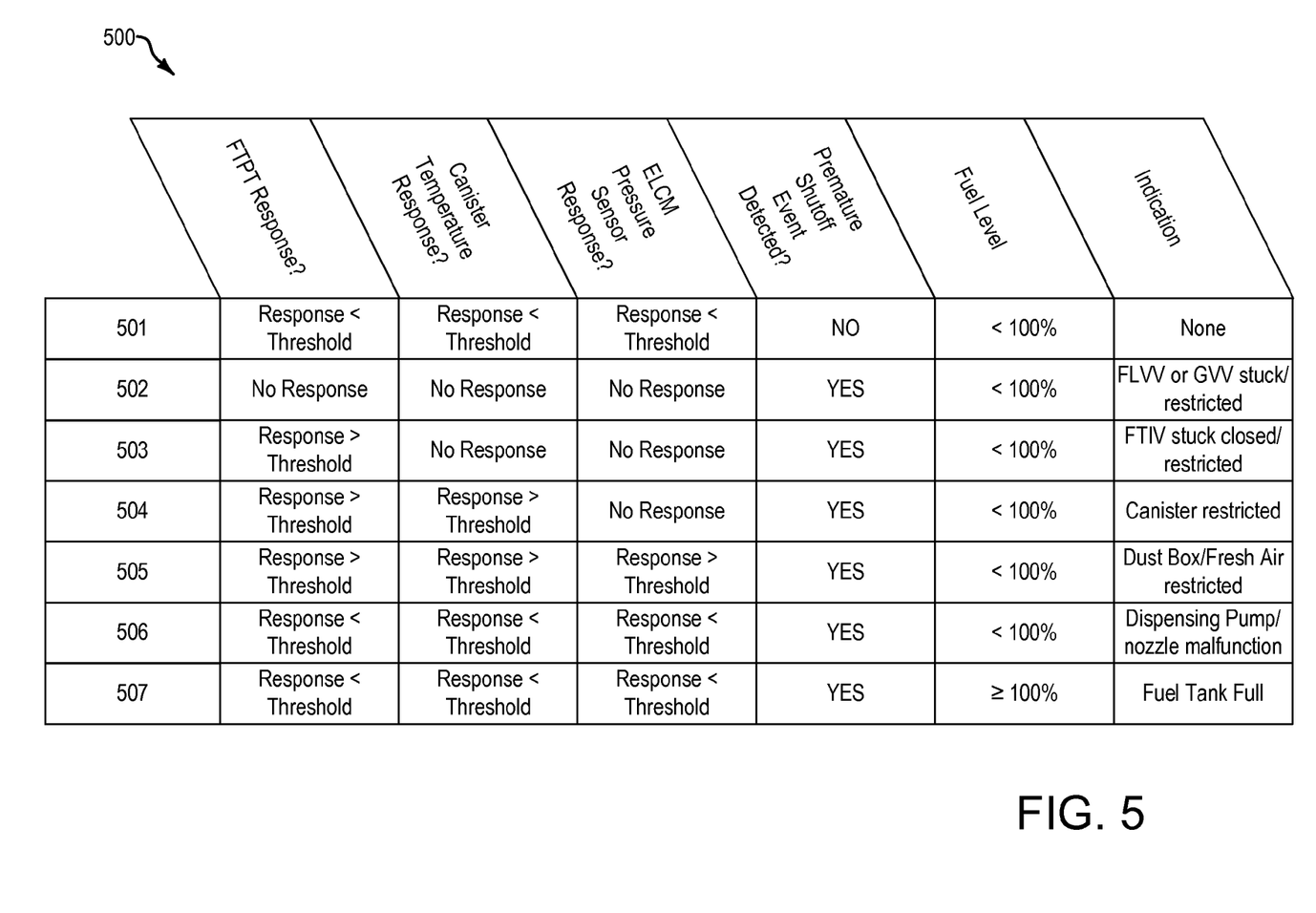
FIG. 5 shows an example lookup table for determining the cause of a premature shutoff event.

The following description related to systems and methods for detecting and diagnosing causes for premature shutoff events occurring while refueling a fuel tank. The fuel tank may be included in a vehicle, such as a hybrid electric vehicle, as shown in FIG. 1. The vehicle may include a fuel system and an evaporative emissions system, as shown in FIG. 2. As shown in FIG. 3, conditions at various points within the fuel system and evaporative emissions system may be monitored throughout a refueling event. In the event of a premature shutoff event during the refueling event, the monitored conditions may be used to pinpoint the cause of the premature shutoff event. FIG. 4 depicts a method for determining the cause of the premature shutoff event based on the monitored conditions, whereas FIG. 5 depicts a look-up table that may be utilized to determine the cause of the premature shutoff event.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 3-4.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

The refueling system and evaporative emissions system may be configured to sequester fuel vapors during refueling events, and further configured to trigger the shutoff of a refueling pump when the fuel level in the fuel tank increases above a threshold. Shutoff of a refueling pump may also be triggered under conditions where there is a restriction in the refueling system and/or the evaporative emissions system impeding the movement of fuel vapor and/or fresh air through the evaporative emissions system. This may lead to premature shutoff events, where the refueling pump is shutoff prior to reaching a fuel tank fill threshold. Diagnosing the reason for premature shutoff events may incur a costly procedure whereby the entire evaporative emissions system is disassembled in an effort to locate the problematic restriction.

FIG. 3 depicts a flow chart for a high-level method 300 for a refueling routine in accordance with the current disclosure. In particular, method 300 describes a method for monitoring refueling system conditions during a refueling event. Method 300 will be described herein with reference to the components and systems depicted in FIGS. 1 and 2, though the method may be applied to other systems without departing from the scope of this disclosure. Method 300 may be carried out by controller 212, and may be stored as executable instructions in non-transitory memory.

Method 300 may begin at 310 by determining whether a refueling event is anticipated or has been requested. Determining whether a refueling event is anticipated or requested may include direct or indirect liquid refueling requests from the vehicle operator. Direct refueling requests may include explicit operator requests made through an interface or detection of an operator opening a refueling door. Indirect liquid refueling requests may include the detection of a proximity to a refueling station. Proximity to a refueling station may be determined through GPS or other location data, or based on direct communication between the vehicle and refueling station. If no direct or indirect refueling request is detected, method 300 may proceed to 315. At 315, method 300 may include maintaining the fuel system status. For example, method 300 may include maintaining liquid refueling lock 267 closed. Method 300 may then end.

If a refueling event is anticipated or has been requested, method 300 may proceed to 320. At 320, method 300 may include determining whether entry conditions for a refueling routine are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running Entry conditions may include a fuel tank pressure being below a threshold and/or a fuel tank liquid level being below a threshold. Fuel tank pressure may be measured by a pressure sensor, such as pressure sensor 291. Fuel tank liquid level may be measured by a liquid level sensor, such as liquid level sensor 234. Other conditions, such as fuel tank temperature, ambient temperature, atmospheric pressure, etc. may be gauged to determine whether liquid fuel can be added to fuel tank 200. If entry conditions for refueling are not met (e.g. fuel tank pressure is above a threshold) method 300 may proceed to 315. At 315, method 300 may include maintaining the fuel system status. Method 300 may then end.

If entry conditions for refueling are met, method 300 may proceed to 330. At 330, method 300 may include preparing the fuel system for refueling. Preparing the fuel system for refueling may include opening or maintaining open a fuel tank isolation valve, such as FTIV 252. Preparing the fuel system for refueling may further include opening or maintaining open a canister vent valve, such as CVV 229. Preparing the fuel system for refueling may include closing or maintaining closed a canister purge valve, such as CPV 261. Preparing the fuel system for refueling may include maintaining controller 212 or another PCM on, even during a key-off event. Preparing the fuel system for refueling may further include unlocking a refueling lock, such as refueling lock 245, and allowing access to refueling system 219.

Continuing at 340, method 300 may include establishing system baselines. In other words, method 300 may include measuring or inferring system conditions, and using these system conditions as baseline measurements prior to the start of the refueling event. System baselines may include fuel tank fill level, fuel tank pressure, fuel vapor canister temperature, and ELCM pressure. Fuel tank fill level may be measured by a fuel level sensor, such as fuel level sensor 234. Fuel tank pressure may be measured by a fuel tank pressure sensor, such as FTPT 291. Fuel vapor canister temperature may be measured by a canister temperature sensor, such as temperature sensor 232. ELCM pressure may be measured by an ELCM pressure sensor, such as pressure sensor 296. Other ambient conditions, such as temperature, barometric pressure, humidity, etc. may also be measured or inferred as necessary to correlate fuel system conditions.

Continuing at 350, method 300 may include monitoring system conditions during a refueling event. For example, method 300 may include monitoring fuel tank fill level, fuel tank pressure, fuel vapor canister temperature, ELCM pressure, and other conditions with established baselines as determined at 340. In this way, the movement of fuel vapors through the evaporative emissions system can be monitored throughout the refueling event. System conditions may be monitored as absolute values, or as ratios based on the established baselines.

Continuing at 360, method 300 may include determining whether a premature shutoff event has been detected. Determining whether a premature shutoff event has been detected may include determining if a refueling pump has automatically shutoff prior to the fuel tank fill level increasing above a fill level threshold. This may be determined from the on-board sensors monitoring system conditions as described herein, and/or via communication with a refueling station or refueling pump.

If no premature shutoff event is detected, method 300 may proceed to 315. At 315, method 300 may include maintaining the fuel system status. Method 300 may then end. If a premature shutoff event is detected, method 300 may proceed to 370. At 370, method 300 may include determining the reason for premature shutoff based on system conditions as monitored during the refueling event. Determining the reason for premature shutoff may include evaluating the system conditions via a subroutine, such as method 400 as described herein and as depicted in FIG. 4, and/or may include evaluating the system conditions via a lookup table, such as lookup table 500 as described herein and as depicted in FIG. 5. When a reason for premature shutoff has been determined, method 300 may proceed to 380.

At 380, method 300 may include indicating the reason for premature shutoff. Indicating the reason for premature shutoff may include setting a flag or code within controller 12, the flag or code representative of the reason for premature shutoff, and may further include illuminating a malfunction indication lamp (MIL). Method 300 may then end.

FIG. 4 depicts a flow chart for a high-level method 400 for a determining the cause of a premature shutoff event during refueling in accordance with the current disclosure. In particular, method 400 describes a method for localizing a restriction based on refueling system conditions during a refueling event. Method 400 will be described herein with reference to the components and systems depicted in FIGS. 1 and 2, though the method may be applied to other systems without departing from the scope of this disclosure. Method 400 may be carried out by controller 212, and may be stored as executable instructions in non-transitory memory. Method 400 may be run as a standalone routine, or may be run as a subroutine of another method, such as method 300 as described herein.

Method 400 may begin at 405 following a premature shutoff event. At 405, method 400 may include determining whether a fuel tank pressure transducer (FTPT) response during the prematurely terminated refueling event was greater than 0. The FTPT response may comprise a change in fuel tank pressure as determined by the FTPT from the beginning of the refueling event until the premature termination of the refueling event. If the FTPT response is not greater than 0, method 400 may proceed to 410. At 410, method 400 may include indicating a malfunction in either the FLVV or GVV. Indicating a malfunction in the FLVV or GVV may include setting a flag or code at controller 12, and may further include illuminating an MIL. In this way, a premature shutoff event that occurs prior to a change in fuel tank pressure may be attributed to an FLVV or GVV malfunction. Method 400 may then end.

If the FTPT response is determined to be greater than 0 at 405, method 400 may proceed to 415. At 415, method 400 may include determining whether the FTPT response during the prematurely terminated refueling event was greater than a threshold. The threshold may be predetermined, or may be based on current fuel system conditions and current ambient conditions. If the FTPT response is determined to be less than the threshold, method 400 may proceed to 420. At 420, method 400 may include determining whether the fuel level in the fuel tank was greater than or equal to 100% of fuel tank capacity at the time of the premature shutoff event. Fuel level in the fuel tank at the time of the premature shutoff may be determined through a fuel level sensor, such as sensor 234. If the fuel level in the fuel tank is determined to be greater than or equal to 100% of fuel tank capacity at the time of the premature shutoff event, method 400 may proceed to 425. At 425, method 400 may include indicating that the fuel tank is full. In this way, a premature shutoff event that occurs because the fuel tank was already full can be annotated as such. Indicating that the fuel tank was full may include setting a flag or code at controller 12, and may further include determining whether the fuel tank level indicator properly reflects the current fuel tank level. If the fuel tank level indicator does not reflect the current fuel tank level, the MIL may be illuminated. Method 400 may then end.

Returning to 420, if the fuel level in the fuel tank is determined to be less than 100% of fuel tank capacity at the time of the premature shutoff event, method 400 may proceed to 430. At 430, method 400 may include determining whether multiple premature shutoff events have been recorded. For example, multiple premature shutoff events may comprise three consecutive premature shutoff events. If multiple premature shutoff events have been recorded, method 400 may proceed to 435. At 435, method 400 may include indicating a malfunction in the fuel dispenser or fuel dispenser nozzle, for example, by setting a flag or code at controller 12. In this way, a faulty fuel dispenser or fuel dispenser nozzle may not result in unnecessary warranty maintenance. Method 400 may then end.

Returning to 430, if multiple premature shutoff events have not been recorded, method 400 may proceed to 440. At 440, method 400 may include indicating an indeterminate malfunction. In some examples, if a premature shutoff event is followed by a refueling event that does not end in a premature shutoff event, the premature shutoff event may be attributed to a refueling nozzle being improperly engaged with the refueling passage. In such examples, where the refueling nozzle was subsequently properly engaged, no malfunction may be indicated. Method 400 may then end.

Returning to 415, if the FTPT response is determined to be greater than the threshold, method 400 may proceed to 450. At 450, method 400 may include determining whether a canister temperature response during the prematurely terminated refueling event is greater than a threshold. The threshold may be predetermined, or may be based on current conditions, such as fuel level prior to refueling, canister saturation level, ambient temperature, etc. Canister temperature may be determined by a canister temperature sensor, such as sensor 232 as shown in FIG. 2. If the canister temperature response is less than the threshold, method 400 may proceed to 455. At 455, method 400 may include indicating an FTIV malfunction. Indicating a malfunction in the FTIV may include setting a flag or code at controller 12, and may further include illuminating an MIL. In this way, an FTIV that is stuck in a closed position will be diagnosed by determining that fuel vapor is not reaching the fuel vapor canister during the prematurely terminated refueling attempt. Method 400 may then end.

Returning to 450, if the canister temperature response is greater than the threshold, method 400 may proceed to 460. At 460, method 400 may include determining whether an ELCM pressure response is greater than a threshold. The threshold may be predetermined, or may be based on current fuel system conditions and current ambient conditions. ELCM pressure may be determined by an ELCM pressure sensor, such as pressure sensor 296 as depicted in FIG. 2. If the ELCM pressure response is less than the threshold, method 400 may proceed to 465. At 465, method 400 may include indicating a canister restriction. Indicating a restriction in the fuel vapor canister may include setting a flag or code at controller 12, and may further include illuminating an MIL. In this way, canister that has an air vent restriction or blockage will be diagnosed by determining that air pressure is not changing in the vent line during the prematurely terminated refueling attempt. Method 400 may then end.

Returning to 460, if the ELCM pressure response is greater than the threshold, method 400 may proceed to 470. At 470, method 400 may include indicating a dust box or fresh air line restriction. Indicating a restriction in the dust box or fresh air line may include setting a flag or code at controller 12, and may further include illuminating an MIL. Method 400 may then end.

FIG. 5 shows an example table 500 that may be used as a lookup table for determining a reason for a premature shutoff event during a refueling event. Table 500 may be used in conjunction with a method for determining the reason for a premature shutoff event, such as method 300. Table 500 may be stored in non-transitory memory in controller 12.

Table 500 includes 7 conditions that may be indicated, but may include additional conditions in examples where additional sensor data is acquired during refueling events. Table 500 indicates conditions that may have led to a premature shutoff event based on FTPT response, canister temperature response, ELCM pressure sensor response, fuel level, and the detection of a premature shutoff event. As described herein and with regards to FIGS. 3 and 4, sensor data may be collected during a refueling event. Sensor responses may refer to changes in sensor readings from the beginning of a refueling event to the end of a refueling event, whether the refueling event is terminated prematurely or not. Sensor responses may be compared to one or more thresholds in order to classify the magnitude of the sensor response.

Row 501 describes conditions that may be recorded during a refueling event that would lead to no indication of a premature shutoff event. For example, conditions may include an FTPT response greater than zero, but less than a threshold, a canister temperature response greater than zero but less than a threshold, an ELCM pressure sensor response greater than zero but less than a threshold, no detection of a premature shutoff event, and a fuel level less than 100% of the fuel tank capacity. These conditions indicate that refueling has been interrupted, but that no conditions indicate a premature shutoff event, and further, that no conditions indicate a restriction in the refueling system or evaporative emissions system. For example, row 501 may represent conditions indicative of a refueling pump operator disengaging the fuel nozzle or fuel release accidentally.

Row 502 describes conditions that may be recorded during a refueling event that would lead to an indication of an FLVV or GVV restriction. For example, conditions may include an FTPT response equal to zero, a canister temperature response equal to zero, an ELCM pressure sensor response equal to zero, the detection of one or more premature shutoff events, and a fuel level less than 100% of the fuel tank capacity. These conditions indicate that refueling is interrupted due to an FLVV or GVV restriction. In some examples, the FTPT, canister temperature, and/or ELCM pressure sensor responses may be greater than zero, but less than a threshold, indicating that the FLVV or GVV is restricted, but not necessarily stuck in a closed position.

Row 503 describes conditions that may be recorded during a refueling event that would lead to an indication of an FTIV restriction. For example, conditions may include an FTPT response greater than a threshold, a canister temperature response equal to zero, an ELCM pressure sensor response equal to zero, the detection of one or more premature shutoff events, and a fuel level less than 100% of the fuel tank capacity. These conditions indicate that refueling is interrupted due to an FTIV restriction. For example, these conditions may indicate that fuel is initially entering the fuel tank, but that fuel vapor is unable to reach the fuel vapor canister due to a restricted FTIV. In some examples, the canister temperature and/or ELCM pressure sensor responses may be greater than zero, but less than a threshold, indicating that the FTIV is restricted, but not necessarily stuck in a closed position.

Row 504 describes conditions that may be recorded during a refueling event that would lead to an indication of a fuel vapor canister restriction. For example, conditions may include an FTPT response greater than a threshold, a canister temperature response greater than a threshold, an ELCM pressure sensor response equal to zero, the detection of one or more premature shutoff events, and a fuel level less than 100% of the fuel tank capacity. These conditions indicate that refueling is interrupted due to a canister restriction. For example, these conditions may indicate that fuel vapor is able to reach the fuel vapor canister, but that air stripped of fuel vapor is unable to exit the fuel vapor canister. In some examples, the ELCM pressure sensor response may be greater than zero, but less than a threshold, indicating that the canister is restricted, but not necessarily stuck in a closed position.

Row 505 describes conditions that may be recorded during a refueling event that would lead to an indication of a dust box or fresh air line restriction. For example, conditions may include an FTPT response greater than a threshold, a canister temperature response greater than a threshold, an ELCM pressure sensor response greater than a threshold, the detection of one or more premature shutoff events, and a fuel level less than 100% of the fuel tank capacity. These conditions indicate that refueling is interrupted due to a dust box or fresh air line restriction. For example these conditions may indicate that fresh air is unable to enter or exit the vent line, impeding the clearing of air stripped of fuel vapor at the canister.

Row 506 describes conditions that may be recorded during a refueling event that would lead to an indication of a dispensing pump or dispensing nozzle malfunction. For example, conditions may include an FTPT response less than a threshold, a canister temperature response less than a threshold, an ELCM pressure sensor response less than a threshold, the detection of one or more premature shutoff events, and a fuel level less than 100% of the fuel tank capacity. Prior to indicating a reason for a premature shutoff event, multiple premature shutoff events may be recorded. In some examples, the refueling operator may adjust the dispensing pump or dispensing nozzle, resulting in a refueling event without a premature shutoff. In such examples, the premature shutoff event may be disregarded.

Row 507 describes conditions that may be recorded during a refueling event that would lead to an indication of a full fuel tank. For example, conditions may include an FTPT response less than a threshold, a canister temperature response less than a threshold, an ELCM pressure sensor response less than a threshold, the detection of one or more premature shutoff events, and a fuel level greater than or equal to 100% of the fuel tank capacity.

As described herein and with regards to FIG. 2, the refueling system and evaporative emissions system may include numerous additional sensors in addition to the fuel tank pressure transducer, fuel level sensor, canister temperature sensor, and ELCM pressure sensor. The inclusion of additional sensors may allow for the identification of restrictions in a plurality of different locations within the refueling system and/or the evaporative emissions system based on pressure and temperature changes during a refueling event that is prematurely terminated.

Both prior to and during a refueling event, fuel vapor may be diverted from the fuel tank and/or the fuel dispensing nozzle to the fuel vapor canister. Air stripped of fuel vapor by the fuel vapor canister may be diverted to atmosphere. Concurrently, fresh air may be diverted from atmosphere into the vent line. The refueling system and evaporative emissions system may be divided into a number of different sectors by valves (e.g. FTIV 252 and CVV 229) and other devices (e.g. fuel vapor canister 222 and air filter 259). Each different sector may include one or more sensors that may indicate the flow of fuel vapor and/or air into and out of the sector during a refueling event. The inclusion of additional sensors may allow for more precise determination of vapor or air flow into and out of the different sectors the system. For example, a vent line pressure sensor may be included coupled in the vent line between CVV 229 and air filter 259. Upon refueling, a pressure change at the ELCM pressure sensor that is not accompanied by a pressure change at the vent line pressure sensor may indicate a restriction at the CVV. In another example, the fuel vapor canister 222 may include a temperature sensor 232, as shown in FIG. 2. Further, the fuel vapor canister buffer region 222a may include a separate temperature sensor. Upon refueling, a temperature change in the buffer region that is not accompanied by a temperature change in the canister region may indicate a restriction between the buffer region and the canister.

In this way, it may be possible to indicate an absolute and/or relative location of restrictions, blockages, and degradation within the system depending on pressure and temperature changes during a refueling event. The expected pressure and temperature changes may be compared to actual pressure and temperature changes to determine the location of a restriction. Expected pressure and temperature changes may be based on the expected flow of fuel vapor and air if no restrictions exist in the system. A restriction at a location within the system closer to atmosphere may be identified under different conditions than for a restriction at a location within the system further from atmosphere. For example, a restriction close to atmosphere may be identified by conditions wherein sectors further from atmosphere demonstrate pressure and temperature changes that are within a threshold of their respective expected pressure and temperature changes, while concurrently sectors closer to atmosphere demonstrate pressure and temperature changes that are not within a threshold of their respective expected pressure and temperature changes.

In other words, if a restriction exists at a valve or device located between the fuel filler system and the atmospheric end of the vent line, the different sectors upstream of the restriction may demonstrate pressure and temperature changes within a threshold of their respective expected pressure and temperature changes, while different sectors downstream of the restriction may demonstrate pressure and temperature changes that are not within a threshold of their respective expected pressure and temperature changes. Restrictions may thus be indicated for a valve or device located between a sector that demonstrates a pressure and/or temperature change within a threshold of the expected pressure and/or temperature change and a sector that demonstrates a pressure and/or temperature change that is not within a threshold of the expected pressure and/or temperature change. In this way, a discrete potential leak location may be identified from among a list of discrete potential leak locations. Each discrete potential restriction location may include one or more pressure or temperature sensors, and may comprise a segment of a conduit located between two or more valves or devices. The conditions for identifying a restriction in a first discrete potential restriction location may be different than the conditions for identifying a restriction in second discrete potential restriction location, different from the first discrete potential restriction location. As such, as conditions are monitored during refueling, different monitored conditions may result in different potential restriction locations being identified as the cause of a premature shutoff event.

The systems described herein and depicted in FIGS. 1 and 2, along with the methods described herein and depicted in FIGS. 3, 4, and 5 may thus enable one or more methods and one or more systems. In one example, a method for localizing restrictions in a fuel system during refueling, comprising: monitoring fuel tank pressure, fuel vapor canister temperature, and evaporative leak check module pressure during a refueling event; and responsive to a premature shutoff event, indicating a location of a restriction among a plurality of locations based on whether monitored pressure and temperature changes during the refueling event are greater than respective thresholds. The method may further comprise: responsive to a fuel tank pressure change being less than a first fuel tank pressure threshold, a fuel vapor canister temperature change being less than a first fuel vapor canister temperature threshold, and an evaporative leak check module pressure change being less than a first evaporative leak check module pressure threshold, indicating a fuel limit vent valve restriction and/or a grade vent valve restriction. The method may further comprise: responsive to a fuel tank pressure change being greater than a second fuel tank pressure threshold, the second fuel tank pressure threshold being greater than the first fuel tank pressure threshold, a fuel vapor canister temperature change being less than the first fuel vapor canister temperature threshold, and an evaporative leak check module pressure change being less than the first evaporative leak check module pressure threshold, indicating a fuel tank isolation valve restriction. The method may further comprise: responsive to a fuel tank pressure change being greater than the second fuel tank pressure threshold, a fuel vapor canister temperature change being greater than a second fuel vapor canister temperature threshold, the second fuel vapor canister temperature threshold being greater than the first fuel vapor canister temperature threshold, and an evaporative leak check module pressure change being less than the first evaporative leak check module pressure threshold, indicating a fuel vapor canister restriction. The method may further comprise: responsive to a fuel tank pressure change being greater than the second fuel tank pressure threshold, a fuel vapor canister temperature change being greater than the second fuel vapor canister temperature threshold, and an evaporative leak check module pressure change being greater than a second evaporative leak check module pressure threshold, the second evaporative leak check module pressure threshold being greater than the first evaporative leak check module pressure threshold, indicating a vent line restriction. The method may further comprise: responsive to a fuel tank pressure change being greater than the first fuel tank pressure threshold and less than the second fuel tank pressure threshold, a fuel vapor canister temperature change being greater than the first fuel vapor canister temperature threshold and less than the second fuel vapor canister temperature threshold, and an evaporative leak check module pressure change being greater than the first evaporative leak check module pressure threshold and less than the second evaporative leak check module pressure threshold, indicating a dispensing pump malfunction. In some embodiments, indicating a dispensing pump malfunction further comprises: indicating a dispensing pump malfunction only after two or more premature shutoff events have been recorded. In some examples, the method may further comprise: monitoring fuel tank fill level during the refueling event; indicating a dispensing pump malfunction only when a fuel tank fill level is less than a fuel tank fill level threshold. The method may further comprise: indicating a full fuel tank when the fuel tank fill level is greater than or equal to the fuel tank fill level threshold. The technical result of implementing this method is the ability to diagnose a premature shutoff event using sensors included in the fuel system, thus incurring warranty savings while maintaining production costs.

In another example, a fuel system for a vehicle, comprising: a fuel tank for storing fuel used by a vehicle engine; one or more fuel limit vent valves coupled to the fuel tank; a grade vent valve coupled to the fuel tank; a fuel tank pressure transducer coupled to the fuel tank; a canister coupled to the fuel tank for receiving and storing fuel vapors; a fuel tank isolation valve coupled between the fuel tank and the canister; a vent line coupled between the canister and atmosphere; and a control system including executable instructions stored in non-transitory memory for: during a refueling event, monitoring a fuel tank pressure;

and responsive to a premature shutoff event, indicating a restriction in the grade vent valve and/or the one or more fuel limit vent valves when a fuel tank pressure change during the refueling event is less than a first fuel tank pressure threshold. The fuel system may further comprise: a temperature sensor coupled to the canister; and the control system may further include executable instructions stored in non-transitory memory for: during a refueling event, monitoring a canister temperature; and responsive to a premature shutoff event, indicating a restriction in the fuel tank isolation valve when a fuel tank pressure change during the refueling event is greater than a second fuel tank pressure threshold, the second fuel tank pressure threshold being greater than the first fuel tank pressure threshold, and when a canister temperature change during the refueling event is less than a first canister temperature threshold. The fuel system may further comprise: an evaporative leak check module coupled in the vent line between the canister and atmosphere; a pressure sensor coupled to the evaporative leak check module; and the control system may further include executable instructions stored in non-transitory memory for: during a refueling event, monitoring an evaporative leak check module pressure; and responsive to a premature shutoff event, indicating a restriction in the canister when a fuel tank pressure change during the refueling event is greater than the second fuel tank pressure threshold, when a canister temperature change during the refueling event is greater than a second canister temperature threshold, the second canister temperature threshold being greater than the first canister temperature threshold, and when an evaporative leak check module pressure change during the refueling event is less than a first evaporative leak check module pressure threshold. The control system may further include executable instructions stored in non-transitory memory for: responsive to a premature shutoff event, indicating a restriction in the vent line when a fuel tank pressure change during the refueling event is greater than the second fuel tank pressure threshold, when a canister temperature change during the refueling event is greater than the second canister temperature threshold, and when an evaporative leak check module pressure change during the refueling event is greater than a second evaporative leak check module pressure threshold, the second evaporative leak check module pressure threshold being greater than the first evaporative leak check module pressure threshold. The control system further may include executable instructions stored in non-transitory memory for: responsive to a premature shutoff event, indicating a dispensing pump malfunction when a fuel tank pressure change during the refueling event is greater than the first fuel tank pressure threshold and less than the second fuel tank pressure threshold, when a canister temperature change during the refueling event is greater than the first canister temperature threshold and less than the second canister temperature threshold, and when an evaporative leak check module pressure change during the refueling event is greater than the first evaporative leak check module pressure threshold and less than the second evaporative leak check module pressure threshold. The control system may further include executable instructions stored in non-transitory memory for: indicating a dispensing pump malfunction only after two or more premature shutoff events have been recorded. The fuel system may further comprise: a fuel level sensor coupled within the fuel tank; and the control system may further include executable instructions stored in non-transitory memory for: monitoring fuel tank fill level during the refueling event; indicating a dispensing pump malfunction only when a fuel tank fill level is less than a fuel tank fill level threshold. The control system may further include executable instructions stored in non-transitory memory for: indicating a full fuel tank when the fuel tank fill level is greater than or equal to the fuel tank fill level threshold. The technical result of implementing this system is the self-diagnosis of the cause of a pre-mature shutoff event without requiring the dismantling and inspection of the entire fuel system. This may allow for a decrease in the time, money, and resources needed to diagnose and repair restrictions within the fuel system.

In another example, a method for a vehicle fuel system, comprising: receiving a request for a refueling event; venting fuel vapor from a fuel tank to a fuel vapor canister by opening a fuel tank isolation valve; allowing the vehicle fuel system to equilibrate; establishing baseline values for fuel tank pressure, fuel vapor canister temperature, and evaporative leak check module pressure; monitoring values for fuel tank pressure, fuel vapor canister temperature, and evaporative leak check module pressure during the refueling event; responsive to a premature shutoff event, indicating a location of a restriction among a plurality of locations based on whether monitored pressure and temperature changes during the refueling event are greater than respective thresholds. The method may further comprise: indicating a restricted fuel level vent valve or grade vent valve responsive to no change in fuel tank pressure during the refueling event; and indicating a restriction of the fuel tank isolation valve responsive to a fuel tank pressure change during the refueling event being greater than a fuel tank pressure threshold, and to no change in canister temperature or evaporative leak check module pressure during the refueling event. The method may further comprise: indicating a restriction of the canister responsive to a fuel tank pressure change during the refueling event being greater than the fuel tank pressure threshold, to a canister temperature change during the refueling event being greater than a canister temperature threshold, and to no change in evaporative leak check module pressure during the refueling event; and indicating a restriction of a vent line responsive to a fuel tank pressure change during the refueling event being greater than the fuel tank pressure threshold, to a canister temperature change during the refueling event being greater than a canister temperature threshold, and to a evaporative leak check module pressure change being greater than a evaporative leak check module pressure threshold. The technical result of implementing this method is that different potential restriction points that may lead to premature shutoff events may be discerned using sensors within the fuel system. Different conditions monitored during a refueling event may be indicative of different restriction locations within the fuel system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system for a vehicle, comprising:
a fuel tank for storing fuel used by a vehicle engine;
one or more fuel limit vent valves coupled to the fuel tank;
a grade vent valve coupled to the fuel tank;
a fuel tank pressure transducer coupled to the fuel tank;
a canister coupled to the fuel tank for receiving and storing fuel vapors;
a fuel tank isolation valve coupled between the fuel tank and the canister;
a vent line coupled between the canister and atmosphere; and
a control system including executable instructions stored in non-transitory memory for:
during a refueling event, monitoring a fuel tank pressure; and
responsive to a premature shutoff event, indicating a restriction in the grade vent valve and/or the one or more fuel limit vent valves when a fuel tank pressure change during the refueling event is less than a first fuel tank pressure threshold.

2. The fuel system of claim 1, further comprising:
a temperature sensor coupled to the canister;
wherein the control system further includes executable instructions stored in non-transitory memory for:
during a refueling event, monitoring a canister temperature; and
responsive to a premature shutoff event, indicating a restriction in the fuel tank isolation valve when a fuel tank pressure change during the refueling event is greater than a second fuel tank pressure threshold, the second fuel tank pressure threshold being greater than the first fuel tank pressure threshold, and when a canister temperature change during the refueling event is less than a first canister temperature threshold.

3. The fuel system of claim 2, further comprising:
an evaporative leak check module coupled in the vent line between the canister and atmosphere; and
a pressure sensor coupled to the evaporative leak check module;
wherein the control system further includes executable instructions stored in non-transitory memory for:
during a refueling event, monitoring an evaporative leak check module pressure; and
responsive to a premature shutoff event, indicating a restriction in the canister when a fuel tank pressure change during the refueling event is greater than the second fuel tank pressure threshold, when a canister temperature change during the refueling event is greater than a second canister temperature threshold, the second canister temperature threshold being greater than the first canister temperature threshold, and when an evaporative leak check module pressure change during the refueling event is less than a first evaporative leak check module pressure threshold.

4. The fuel system of claim 3, wherein the control system further includes executable instructions stored in non-transitory memory for:
responsive to a premature shutoff event, indicating a restriction in the vent line when a fuel tank pressure change during the refueling event is greater than the second fuel tank pressure threshold, when a canister temperature change during the refueling event is greater than the second canister temperature threshold, and when an evaporative leak check module pressure change during the refueling event is greater than a second evaporative leak check module pressure threshold, the second evaporative leak check module pressure threshold being greater than the first evaporative leak check module pressure threshold.

5. The fuel system of claim 4, wherein the control system further includes executable instructions stored in non-transitory memory for:
responsive to a premature shutoff event, indicating a dispensing pump malfunction when a fuel tank pressure change during the refueling event is greater than the first fuel tank pressure threshold and less than the second fuel tank pressure threshold, when a canister temperature change during the refueling event is greater than the first canister temperature threshold and less than the second canister temperature threshold, and when an evaporative leak check module pressure change during the refueling event is greater than the first evaporative leak check module pressure threshold and less than the second evaporative leak check module pressure threshold.

6. The fuel system of claim 5, wherein the control system further includes executable instructions stored in non-transitory memory for:
indicating a dispensing pump malfunction only after two or more premature shutoff events have been recorded.

7. The fuel system of claim 5, further comprising:
a fuel level sensor coupled within the fuel tank;
wherein the control system further includes executable instructions stored in non-transitory memory for:
monitoring a fuel tank fill level during the refueling event;
indicating a dispensing pump malfunction only when a fuel tank fill level is less than a fuel tank fill level threshold.

8. The fuel system of claim 7, wherein the control system further includes executable instructions stored in non-transitory memory for:

indicating a full fuel tank when the fuel tank fill level is greater than or equal to the fuel tank fill level threshold.

\* \* \* \* \*